Aug. 1, 1961
W. H. NASH
2,994,805
CIRCUIT RECLOSER WITH TRIP DISABLING DEVICE
Filed Aug. 1, 1957
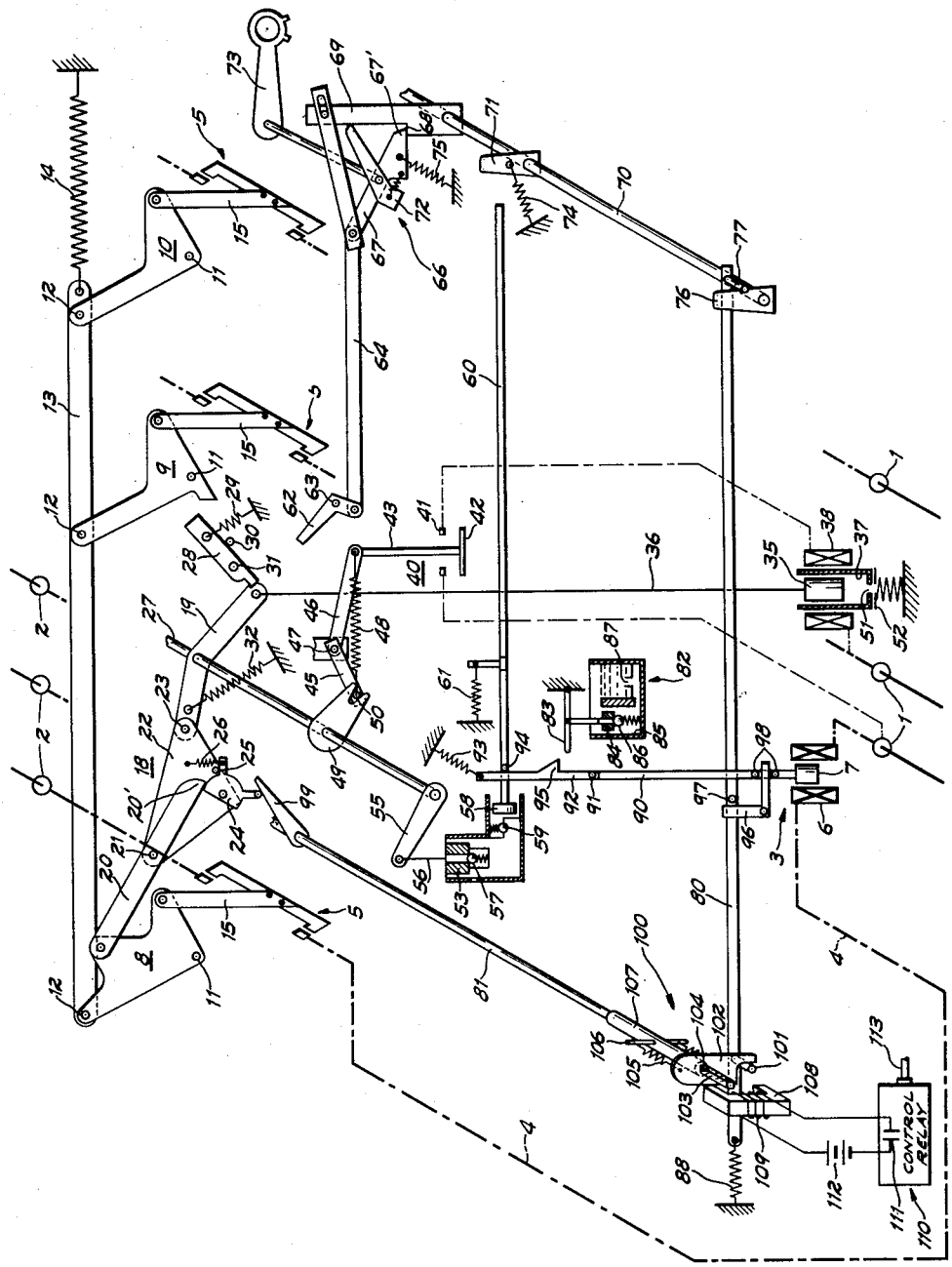
INVENTOR.
William H. Nash
BY Ralph D. Hohenfeldt
Attorney ary of Delaware
United States Patent Office
2,994,805
Patented Aug. 1, 1961

2,994,805
CIRCUIT RECLOSER WITH TRIP DISABLING DEVICE

William H. Nash, South Milwaukee, Wis., assignor to McGraw-Edison Company, Milwaukee, Wis., a corporation of Delaware
Filed Aug. 1, 1957, Ser. No. 675,614
5 Claims. (Cl. 317—22)

This invention relates generally to a circuit interrupter of the type adapted to respond to the presence of fault current by opening and reclosing a predetermined number of times until a fault is cleared or until the interrupter accumulates sufficient operations to lock open. More particularly, the present invention is directed to means for adapting a circuit interrupter of the above mentioned type for opening only under certain electrical conditions and not under others.

A circuit interrupter to which the present invention most aptly applies is in the class commonly known as reclosers, and the apparatus under consideration will be designated a recloser in this application.

A recloser may be characterized as a circuit protective device having interrupting switches, fault sensing devices, operation counting mechanism, lockout mechanism and dual timing mechanism principally contained in a single tank or in such close association as to be considered a single entity. It is usually provided with series connected overload relays that respond to overload currents, flowing in any direction through one or more phases, by instantaneously tripping a predetermined number of times and then automatically shifting to delayed tripping operations of a similar nature. Since reclosers are customarily installed at the origin of a branch circuit or at spaced intervals in a feeder circuit to protect the various line sections against temporary and permanent faults, a simple response to overload currents flowing in any direction is generally satisfactory.

However, the practice of installing reclosers in loop circuits, fed from one or more power sources, is becoming more prevalent. In such cases it is necessary to isolate a fault by opening the nearest protective devices on opposite sides thereof in order to prevent positive power flow to the fault from one source and reverse flow to the fault from around the loop by way of the other source. To achieve this result, it is not only necessary that the various reclosers in the circuit have their time current characteristics and trip settings coordinated, but that they be provided with means for distinguishing between positive and reverse current flow in order that only reclosers on opposite sides of the fault will open while those more remote from the fault will maintain service continuity in the unfaulted line sections.

Accordingly, it is an object of the instant invention to modify a recloser so that it will trip when traversed by overload currents during prevalence of certain circuit conditions and so that it may be prevented from tripping during prevalence of other circuit conditions.

A more specific object of this invention is to increase the versatility of a recloser by providing means for adapting the same to various relay schemes involving reverse current and differential protection, for example.

A further object is to provide a recloser characterized by main switch means that are spring biased toward open position, a general latch means including latch release means normally holding said switches closed, a common trip bar for acting on the latch release means, an overload relay in the one or all phases adapted to actuate said trip bar and thereby cause the recloser to open during predetermined current flow, and a condition responsive coupling that is capable of disconnecting the trip bar from the latch release means when a predetermined current flows in a reverse direction, for example, so that the trip bar cannot release the general latch means regardless of the magnitude of the current.

A specific object of this invention is to provide means for preventing tripping of a recloser under certain conditions of overload without resorting to physically restraining the usual tripping means nor resorting to shunting the overload responsive relays. Incidents of this object, in the first instance, being that large forces need not be set up to overcome the normal tripping inclination of the recloser during overloads and, in the second instance, being dispensing with relay shunting switches.

A general object of this invention is the provision of a new and improved recloser, and more specific objects will appear from time to time throughout the course of the ensuing specification.

One form of the invention involves a spring-biased sliding lever, in the nature of a clutch, that normally effects an operative connection between the trip bar and latch release means, but which lever is capable of being attracted by an electromagnet to a position of inactivity, whereupon the latch may not trip despite abnormal circuit conditions being evidenced by movement of the trip bar.

A preferred embodiment of the invention will now be described in conjunction with the following drawing in which a single sheet schematically represents a repeating polyphase circuit recloser incorporating the novel means for preventing the recloser from tripping under certain circuit conditions.

The exact physical form and mode of operation of the polyphase recloser here serving to illustrate the invention may be found in the copending application of A. Van Ryan et al., Serial No. 379,046, filed September 8, 1953, and assigned to the same assignee as this invention and which is now Patent No. 2,804,521. The concepts of the invention are also applicable to single phase reclosers which are exemplified in the patent art.

Before discussing the improvements constituting the instant invention, the conventional fault protective features of a polyphase recloser will be outlined in reference to the single figure. It will be understood that all the components shown in this figure may be self-contained or housed in a metal tank wherein at least the portion enclosing the interrupting switches is partially or wholly occupied by dielectric fluid. The metal container for the apparatus is not shown, but it normally supports a set of incoming porcelain bushings 1 and outgoing porcelain bushings 2 which are schematically illustrated in the single figure. In each phase, between the source of incoming bushing 1 and the outgoing or load bushing 2 there is a series circuit consisting in an overload responsive relay 3, heavy lead wires 4 and a main interrupting switch 5. Only one of the series overload relays 3 is shown, but it will be understood that there is one such relay in each phase and that each is connected in series with an interrupting switch 5 between a source and load bushing in its corresponding phase. Normally, when any series coil 6 of a relay 3 is traversed by minimum trip current flowing in either direction, that is, usually twice rated load current of the recloser, it attracts magnetic armature 7 and effects tripping of the recloser by means to be described shortly hereinafter.

The interrupting switch 5 of each phase is carried on an associated bell crank 8, 9 and 10, each of which is shaped somewhat differently. Each bell crank is adapted to pivot on a fixed pivot 11 and they are all further pivotally connected at pivots designated 12 to a common power bar 13 to which a switch opening spring 14 is attached.

Under normal circuit conditions, when the recloser is closed as in the single figure, opening spring 14 tends to shift power bar 13 to the right and thereby rotate bell cranks 8, 9, 10 simultaneously in a clockwise direction and to open the various switches 5 by force transmitted from the bell cranks through their insulating switch links 15. Such opening action is, however, normally prohibited by a collapsible general latch means or toggle link assembly, generally designated by the reference numeral 18. When the toggle link assembly is in rigid condition, it restrains the power bar 13, and accordingly, the switches 5 from being operated by the power spring 14.

When the recloser is closed, the toggle link assembly 18 effects a rigid connection between bell crank 8 and a rocking lever 19, the latter of which is normally anchored and participates in a switch resetting operation to be explained later. Toggle link assembly 18 comprises a long link 20 pivotally connected near its midsection by a pivot pin 21 to a triangularly shaped link 22 which may consist in two such members coincident with but spaced from each other so link 20 can enter between them. The triangular link 22 is in turn pivotally connected to the rocking lever 19 at 23. The tendency for the elongated link 20 is to collapse or rotate in a clockwise direction under the influence of opening spring 14 acting on power bar 13, but this is normally prevented by a hemispherical latch release shaft 24 that is pivotally mounted on triangular link 22 and which shaft 24 acts as a stop for link 20. The hemispherical or half-shaft 24 is provided with two ears, one of which is normally biased against a stop pin 25 by a small spring 26 that is anchored to the triangular link 22 as is evident by inspection of the drawing. The tip 20' of the elongated link 20 bears in low frictional relation on the outer periphery of half-shaft 24 so that if the latter is rotated, said tip will move past the flattened portion of half-shaft and allow collapse of the toggle links 20 and 22. Upon this event bell cranks 8, 9 and 10 rotate clockwise through a limited angle and open main switches 5. An explanation of how the toggle link assembly 18 is collapsed in response to electrical line conditions will be set forth later, but for the time being the description will proceed with an explanation of how a sequence of such switch opening operations is brought about and how the recloser is reclosed after each opening operation and finally locked out when a sufficient number of operations have accumulated.

Attention was called previously to rocking lever 19 which participates in resetting switches 5 and in an operation counting function and which is carried on a rock shaft 27 that is journalled in bearings supported by a chassis, neither the chassis nor bearings being shown. Rock shaft 27 and rocking lever 19 remain inactive until the interrupter switches are fully open as a result of latching the rocking lever 19 by a latch arm 28 that is biased by a spring 29 in a clockwise direction against a stop pin 30 and which is carried on a fixed pivot pin 31. Latch lever 28 normally engages and anchors rocking lever 19 as shown when the recloser is closed. When the recloser reaches full open position, however, the center bell crank 9 swing clockwise and impacts latch lever 28 to unlatch the rocking lever 19. Rocking lever 19 then rotates counterclockwise, under the influence of a spring 32 and causes the toggle assembly 18 to be reset in rigid condition in preparation for the power bar 13 being moved to the left so that the various switches 5 may again be reclosed simultaneously. During this brief interval immediately following switch opening, during which time the toggle assembly is reset, rocking lever 19 is to free to elevate a resetting magnetic plunger 35 to which it is attached by means of an insulating link 36. When plunger 35 is again attracted downwardly, all switches 5 reclose and energy is again stored in opening spring 14 in a manner to be described in ensuing paragraphs.

Resetting plunger 35 resides in a dashpot 37 surrounded by a coil 38 that is connected directly across the source, or incoming bushings 1, and is controlled by a snap acting auxiliary switch 40 whose features and mode of operation will now be described. Auxiliary switch 40 is provided with a pair of contacts 41 adapted to be closed by a bridging bar 42 carried by an insulating link 43. Normally, that is, when the recloser is conducting load current, and as will later be evident, during lockout, auxiliary switch 40 is held open and the closing coil 38 is deenergized. The auxiliary switch 40 is adapted to close the circuit through the coil 38 momentarily when the recloser switches 5 are fully open provided lockout has not been reached.

The operating mechanism for the auxiliary switch consists in a pair of links 45 and 46 adapted to swivel on a fixed pivot 47. Opposite ends of the links 45 and 46 are connected through the agency of an overcenter spring 48. The links just named are actuated by means of a slotted arm 49 that is fixedly mounted on rock shaft 27. It will be evident that when shaft 27 rotates through a small counterclockwise angle from its illustrated position, that the slotted arm 49 will carry a pin 50, on the shorter of the toggle links 45, to a point where the line of action of spring 48 will align with the longitudinal axis of the two links. This is an on-center position. As the slotted lever 49 continues to rotate, pin 50 is carried beyond center and the bridging bar 42 is elevated under the influence of the overcenter spring snapping past its dead-center position. This temporarily closes the circuit through the reclosing coil 38 and causes resetting magnetic plunger 35 to be attracted downwardly, whereupon the various switches 5 are reset in a closed position, and opening spring 14 is again extended as mentioned earlier. The rate of descent of reclosing magnetic plunger 35 is controlled by an orifice 51 that is throttled by a spring-biased valve disc 52. In the commercial embodiment of the apparatus, means are provided for varying the reclosing time by adjusting the amount of throttling, but these details are of no consequence insofar as the present invention is concerned so they will not be further developed.

Immediately after energization of closing coil 38, plunger 35 is drawn downwardly and overcenter spring 48 is again shifted to the position in which it is illustrated in the single figure so that the auxiliary switch 40 is opened and the coil deenergized.

Lockout means are provided for preventing reclosure of the apparatus if the fault does not clear after a predetermined number of recloser opening operations, usually four. The lockout means are of the hydraulic type and utilize the dielectric fluid as a hydraulic medium. The lockout means include a pump piston 53, that is driven by angular gyrations of shaft 27, by way of an arm 55 and a link 56 each time the recloser operates. A spring biased ball check valve 57 is provided so that the pump piston does effective work only on its downward stroke. The output of pump piston 53 is delivered to the pressure side of a counting piston 58 through another ball check assembly 59. As the recloser operates repeatedly, counting piston 58 is forced hydraulically to the right, under the influence of pump piston 53, in a step-by-step manner and causes a corresponding movement of a lockout stem 60 which is attached to the counting piston 58. If the number of overcurrent responses is less than that required to cause lockout, lockout piston 58 resettles to its shown position under the influence of a resettling spring 61 which retracts stem 60 to the left after a predetermined time, governed primarily by leakage about the lockout piston and through ball check 59.

Lockout of the recloser is brought about by mechanism that depresses auxiliary closing switch 40 to open position until manually reset. For this purpose there is provided a depressing lever 62 that is pivoted on a stationary pivot 63 and whose angular position is controlled by an elongated link 64. The elongated control link 64 is in turn maintained in its illustrated position by a latch mechanism, generally designated by the reference numeral 66, that includes a latch link 67 whose tip 67' normally bears on the shoulder 68 of a lockout latch lever 69. Lockout latch lever 69 is carried on the same shaft 70 as a short lever 71 that is adapted to be driven by the lockout stem 60 when the latter reaches its farthest position to the right due to the step-by-step movement of lockout piston 58. Consequently, when lockout stem 60 strikes lever 71, lockout latch lever 69 is rotated to the right against a holding spring 74 and thereby releases latch link tip 67' so that link 67 will be biased by a spring 75 toward clockwise rotation. Upon this event, latch link 67 collapses in a clockwise direction and causes the translation of long link 64 to the right. This imparts a counterclockwise movement to the auxiliary switch controlling lever 62 and results in the latter depressing link 43 downwardly, and thereby effecting lockout of the recloser by holding auxiliary switch 40 open.

The shoulder 68 of lockout lever 69 and latch link tip 67' may be re-engaged by manually rotating a resetting lever 72 through the agency of a manual operating handle 73. This allows auxiliary switch 40 to close and re-energize closing coil 38 so that plunger 35 may be attracted to drive the various main switches 5 to their closed positions through the agency of the toggle link mechanism 18, power bar 13, and the bell cranks 8, 9 and 10.

Manual lockout of the recloser can be accomplished by rotating manual operating handle 73 clockwise through approximately a right angle so as to cause lever 72 to pry lockout lever 69 in a clockwise direction and thereby release latch lever 67 as in the case of automatic lockout. However, since manual lockout is initiated when the main switches are closed, it is necessary to break the general latch means or toggle link mechanism 18 by means now to be described. This is done by providing lockout shaft 70 with a short arm 76, at its foremost end, that is adapted to strike a pin 77 carried by a common trip bar 80. Hence, rotation of shaft 70 causes trip bar 80 to be translated to the right and results in a latch control shaft 81, near the left side of the single figure, being rotated in a counterclockwise direction so as to cause the half-shaft 24 to release the tip of elongated link 20, forming part of the general latch means 18. Upon this event, the line switches 5 open and auxiliary reclosing switch 40 is again depressed open and maintained that way until manually reset.

The recloser has a dual time-current characteristic for which is provided means for permitting instantaneous openings during the first of a series of successive operations and causing the remaining opening operations prior to lockout to be retarded or time delayed. Such dual timing means include a normally inactive fluid filled time delay assembly, generally designated by the reference numeral 82. The time delay assembly has an arm 83 that is attached to a hydraulic piston 84 enclosed in a cooperating dashpot cylinder 85. Arm 83 of the time delay assembly resists counterclockwise movement by reason of a ball check 86 sealing the piston and thereby compelling fluid displaced underneath it to pass through a timing orifice 87. After taking a stroke, piston 84 is re-elevated without resistance by reason of the ball check 86 opening and allowing free inflow of fluid underneath the piston through an appropriate hole with which the ball check cooperates.

It will be observed that when an overload occurs, one or all of the overload relay coils 6 attract their associated magnetic armature 7 and cause the downward movement of a long vertical link 90 attached to the armature. Link 90 is hinged at 91 to its upper section 92 which is biased to the right by a return spring 93. As schematically represented, link section 92 does not tilt until one or more recloser operations because it is restrained laterally by a pin 94 that projects from lockout stem 60. On the first of a series of recloser opening operations, downward attraction of magnetic armature 7 is impeded only by the spring 93. However, during succeeding operations, lockout stem 60 shifts to the right under hydraulic influence accompanied by yielding of pin 94, and thereby permits link section 92 to tilt in the same direction. Usually after one or two operations, depending upon how the recloser is set, link section 92 is tilted sufficiently for its pawl 95 to project into the path of the time delay arm 83. Thereafter, further operations of the series overload relays are retarded by the restraint imposed upon the vertical movement of armature 7 as a result of its engagement with the time delay arm 83. Thus, the instantaneous opening operations are followed by time delayed operations until lockout occurs.

Regardless of whether the recloser is executing instantaneous or retarded opening operations, during each such operation magnetic armature 7 is attracted downwardly by one or more series overload relay coils 6. This causes the clockwise rotation of an L-shaped lever 96 whose one end drives the trip bar 80 to the right by engagement with a pin 97 and whose other end is rotated by vertical movement of the armature 7 through the agency of a pair of pins 98 between which it is disposed. It will be understood that each phase is provided with a similar arrangement for driving the common trip bar 80 in response to occurrence of overcurrent although only one such arrangement is shown for the sake of brevity. At any event, whenever trip bar 80 is shifted to the right, trip shaft 81 is rotated counterclockwise so that its lever 99 drives the half-shaft 24 in a clockwise direction to cause collapse of the general toggle latch means 18 and opening of the main switches. Trip bar 80 is always returned to the leftmost shown position, whenever it is shifted to the right, by a return spring 88.

The description thus far has dealt with elements of the recloser that are essential to protect a circuit against overloads of a temporary nature and to lock it open if the overload is permanent. Attention is now invited to the combination of a recloser and a clutch assembly 100 whose purpose is to disable or render the series overload relays 3 ineffective to trip the recloser when certain conditions prevail in the circuit being protected. For example, in some protective schemes it is desirable to trip the recloser only when power is flowing through the recloser in a positive direction. Conversely, it may be desirable to prevent tripping under conditions of reverse power flow. For this purpose, trip shaft 81 is driven by the common trip bar 80 through clutch assembly 100 which may be made responsive to reverse power flow or other electrical conditions.

As illustrated, trip bar 80 is provided near its left end with a transverse drive pin 101 that engages the end of a magnetizable sliding lever 102. Sliding lever 102 is carried on a portion 103 of trip shaft 81 that is square or rectangular in cross section, for example, to effect a keyed connection with a correspondingly shaped hole 104 in lever 102. Normally, lever 102 is biased inwardly by a pair of tension springs 105 that are attached at one end to the lever and anchored on opposite ends of a pin 106 extending radially through the trip shaft 81. The trip shaft is further provided with a collar 107 to prevent excessive inward movement of lever 102.

Immediately adjacent lever 102 and axially of shaft 81 there is provided a C-shaped magnetic core 108 having, preferably, a low voltage winding 109 surrounding part of it. Magnetic core 108 may be energized by an A.C. or D.C. control voltage source exterior to the recloser and controlled through a line condition responsive relay. As an example, there is illustrated in the drawing a control relay 110 provided with a contact 111 which when closed connects a battery 112 in series with the winding 109 of the trip disabling clutch assembly 100. The control relay 110 is merely symbolized, but it will be understood by those versed in the art that the relay may be of the induction disk type adapted to respond to reverse current, for example, or any other line condition that may be beneficially used in a protective scheme to render the recloser incapable of tripping, but capable of conducting load current flowing in one direction or another.

There is further illustrated, in connection with control relay 110 a cable 118, shown broken off and extending from the relay. Cable 113 may embrace multiple conductors that would ordinarily lead to current and potential transformers, not shown, but which are adapted to energize appropriate coils in the relay 110 from the incoming lines leading to bushings 1 or from the outgoing lines leading from bushings 2, the alternative chosen depending upon the application of the invention.

Hence, it is seen that when there is prevailing in the line being protected any condition to which the exterior relay 110 is adapted to respond, that armature 108 will be strongly magnetized and it will attract magnetizable lever 102 toward it as the latter slides on the square portion 103 of the trip shaft 81. This causes lever 102 to be removed from the translational path of drive pin 101 that is carried by the common trip bar 80. Accordingly, even though the flow of current is such as to cause the series overload relays 3 to move trip bar 80 to the right, if core 108 is magnetized, the lever 102 may be disengaged from the trip bar so that the recloser will not trip. When release magnet core 108 is deenergized, magnetic lever 102 is retracted by springs 105 into a position for being engaged again by drive pin 101 of the trip bar 80, and the recloser is thereby restored to its normal overcurrent protective duty.

In conclusion it may be reiterated that the invention illustrates one means for disabling the tripping mechanism of a recloser wherein the tripping impulse from a plurality of phase protective relays is transmitted through a common element for releasing a general latch means and thereby opening phase interrupting switches. Further, one specific trip disabling device, in the form of a magnetic clutch, has been disclosed in detail and it has been suggested how the clutch may be controlled, according to the character of the circuit being protected, by use of a relay external to the recloser. Those versed in the art will now readily perceive how the basic concepts of the invention may be applied to single phase reclosers that do not employ a common trip bar but which trip an interrupting switch through a toggled latch assembly.

Accordingly, although the invention has been described in detail in conjunction with a schematically represented and commercially well known polyphase recloser, such description is to be interpreted as illustrative rather than exclusive, for the invention may be variously embodied in other circuit interrupters. The scope of the invention is therefore to be determined by construing the claims which follow.

It is claimed:

1. A polyphase circuit recloser comprising input and output terminals for each phase, main switch means in circuit between said terminals in respective phases, spring means operatively connected to the several switch means and normally biasing the same toward opening simultaneously, general latch means normally holding said switch means closed in opposition to the spring means, overload relay means including a coil in series with a main switch in each phase and each having a movable armature responding to any coil being traversed by a predetermined current, a common trip bar means to which each armature is operatively linked, a separable coupling connection between said trip bar means and said latch means whereby movement of said bar means may release said latch means to open said switch means, and electromagnetic means operative to separate said coupling connection so that said trip means is uncoupled from said armature whereby movement of said armature in response to the traversing of said coil by said predetermined current does not release said latch means.

2. A polyphase circuit recloser comprising input and output terminals for each phase, main switch means in circuit between said terminals in respective phases, spring means operatively connected to the several switch means and normally biasing the same toward opening simultaneously, general latch means normally holding said switch means closed in opposition to the spring means, overload relay means including a coil in series with a switch in each phase and each having a movable armature responding to any coil being traversed by a predetermined current, a common trip bar means, link means connecting each armature to the trip bar for moving the same in a latch releasing direction in response to movement of any armature responding to predetermined current flow through any series coil, an operating shaft and a sliding lever mounted thereon, said sliding lever operatively connecting said trip bar and latch means when said lever is in one position, and an electromagnet arranged for attracting said sliding lever out of engagement with said trip bar to thereby render said overload relay means ineffective to trip said latch means.

3. A polyphase circuit recloser comprising input and output terminals for each phase, main switch means in circuit between said terminals, spring means operatively connected to said switch means and normally biasing the same toward open position, latch means normally holding said switch means closed in opposition to said spring means, overload relay means including coil means in series with said switch means and armature means movable in response to the traversing of said coil means by a predetermined current, trip bar means connected to said armature means for movement therewith in a latch releasing direction in response to a predetermined current flow through said coil means, operating shaft means rotatable in a first direction to trip said latch means, a sliding lever operatively connecting said trip bar and said operating shaft means when said lever is in a first position, said operating shaft and said trip bar means being uncoupled when said sliding lever is in a second position, and electromagnetic means for attracting said sliding lever from said first to said second position so that said trip bar is uncoupled from said operating shaft means whereby operation of said overload relay means does not affect opening of said contacts.

4. A circuit interrupter comprising input and output terminals, switch means in circuit between said terminals, switch opening means operatively connected to said switch means and normally biasing the same toward open position, latch means normally holding said switch means closed in opposition to said opening means, overload relay means including a coil in series with said switch means and having a movable armature responsive to a predetermined current in said coil, a tripping element operatively connected to said armature, a separable mechanical coupling connection connected between said trip element and said latch means, whereby movement of said armature may release said latch means to open said switch means, and electromagnetic means operative under certain circuit conditions to separate said mechanical coupling connection so that said trip means is uncoupled from said armature whereby movement of said armature in response to said predetermined current does not release said latch means.

5. A circuit interrupter comprising input and output terminals, switch means in circuit between said terminals, overload relay means having a coil in circuit with said terminals and an armature movable in response to an overload, mechanical linkage means including selectively disconnectable link members normally mechanically connecting said armature to said switch means, said link members being operable when connected to transmit mechanical motion so that said switch means may be opened by the action of said armature in response to a predetermined overload condition, and electro-responsive means operative under certain circuit conditions to disconnect said link members and render them inoperative to transmit mechanical motion thereby opening the mechanical connection between said armature and said switch means so that said switch means is unaffected by the actuation of said armature.

References Cited in the file of this patent

UNITED STATES PATENTS

| | | |
|---|---|---|
| 1,684,249 | Stevenson | Sept. 11, 1928 |
| 1,919,895 | Luthi | July 25, 1933 |
| 2,648,803 | Wood | Aug. 11, 1953 |
| 2,713,622 | Smith | July 19, 1955 |
| 2,802,152 | Chabala | Aug. 6, 1957 |
| 2,804,521 | Van Ryan | Aug. 27, 1957 |